Nov. 5, 1935.    T. CROCELLA    2,020,136
PINKING MACHINE
Filed Nov. 7, 1933    2 Sheets-Sheet 1

Thomas Crocella
INVENTOR
BY Victor J. Evans & Co.
ATTORNEY

Nov. 5, 1935.  T. CROCELLA  2,020,136
PINKING MACHINE
Filed Nov. 7, 1933  2 Sheets-Sheet 2
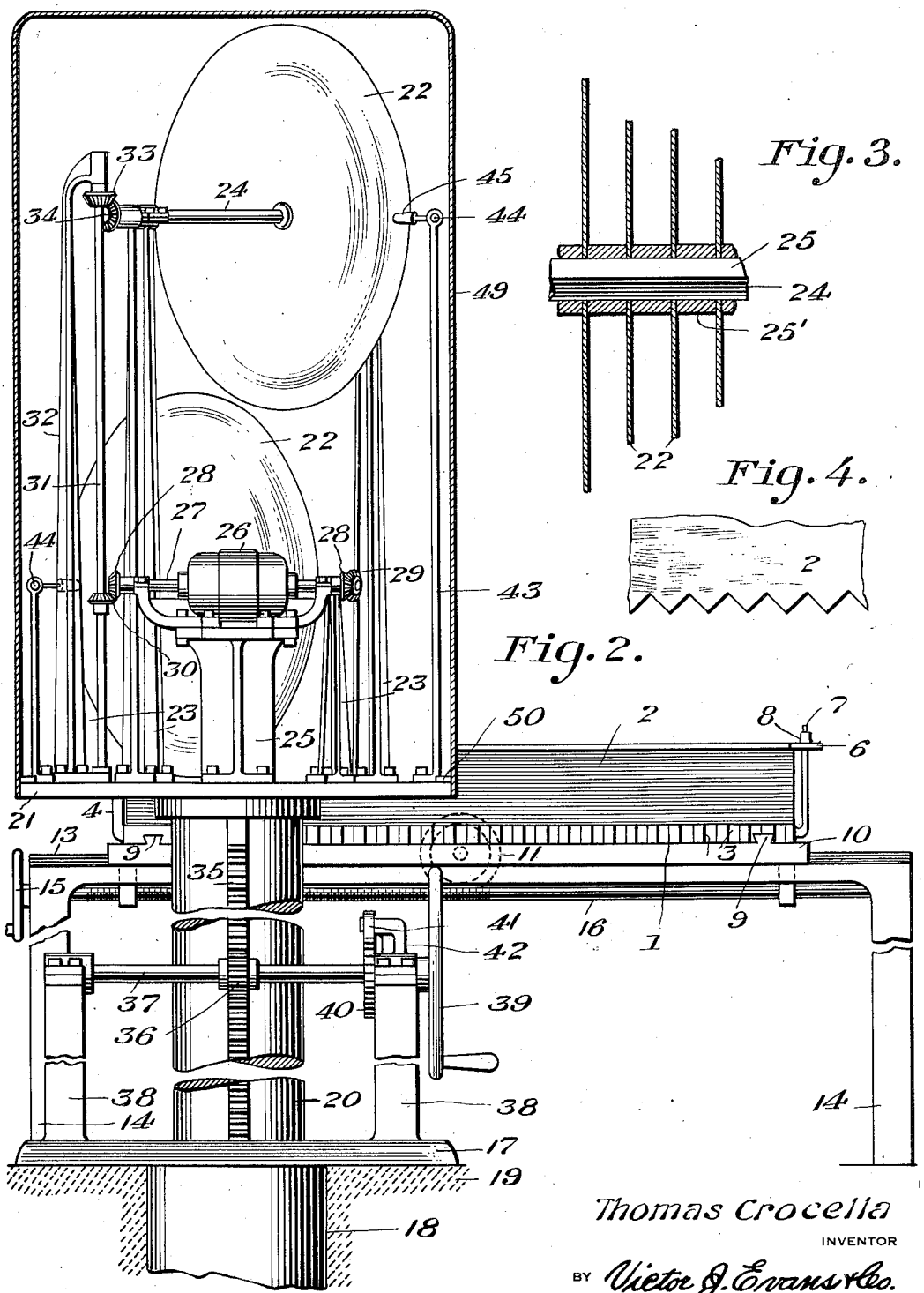
Thomas Crocella
INVENTOR
BY Victor J. Evans & Co.
ATTORNEY Patented Nov. 5, 1935

2,020,136

UNITED STATES PATENT OFFICE 2,020,136

PINKING MACHINE

Thomas Crocella, New York, N. Y.

Application November 7, 1933, Serial No. 697,042

10 Claims. (Cl. 164—61)

My invention relates to improvements in "pinking" machines, so called, for notching the edges of fabric to prevent their ravelling.

The primary object of my invention is to provide an efficient machine for performing the "pinking" operation upon a stack of layers or strips of fabric.

Another object of my invention is to provide a machine equipped for effecting the above operation and for varying the depth of the notches cut in the fabric at will.

Still another object is to equip a machine for operation to cut a plurality of aligned notches in the edges of a stack of fabric strips with a downward cutting action against said stack and by cutting opposite sides of the notches alternately.

My invention is also directed toward providing a practical arrangement of rotary knives for effecting the above operations and means for feeding the stack of fabric strips past said knives to extend the line of notches cut.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therein as do not affect the spirit of the invention nor exceed the scope thereof as expressed in the appended claims.

In said drawings:

Fig. 2 is a view in front elevation, drawn to a reduced scale and with parts shown in section.

Fig. 3 is a fragmentary view of cutters, a cutter shaft, and spacing collars forming part of my novel machine; and Fig. 4 is a fragmentary view of a portion of one of the strips of fabric after the "pinking" operation has been performed thereon.

Figure 1:
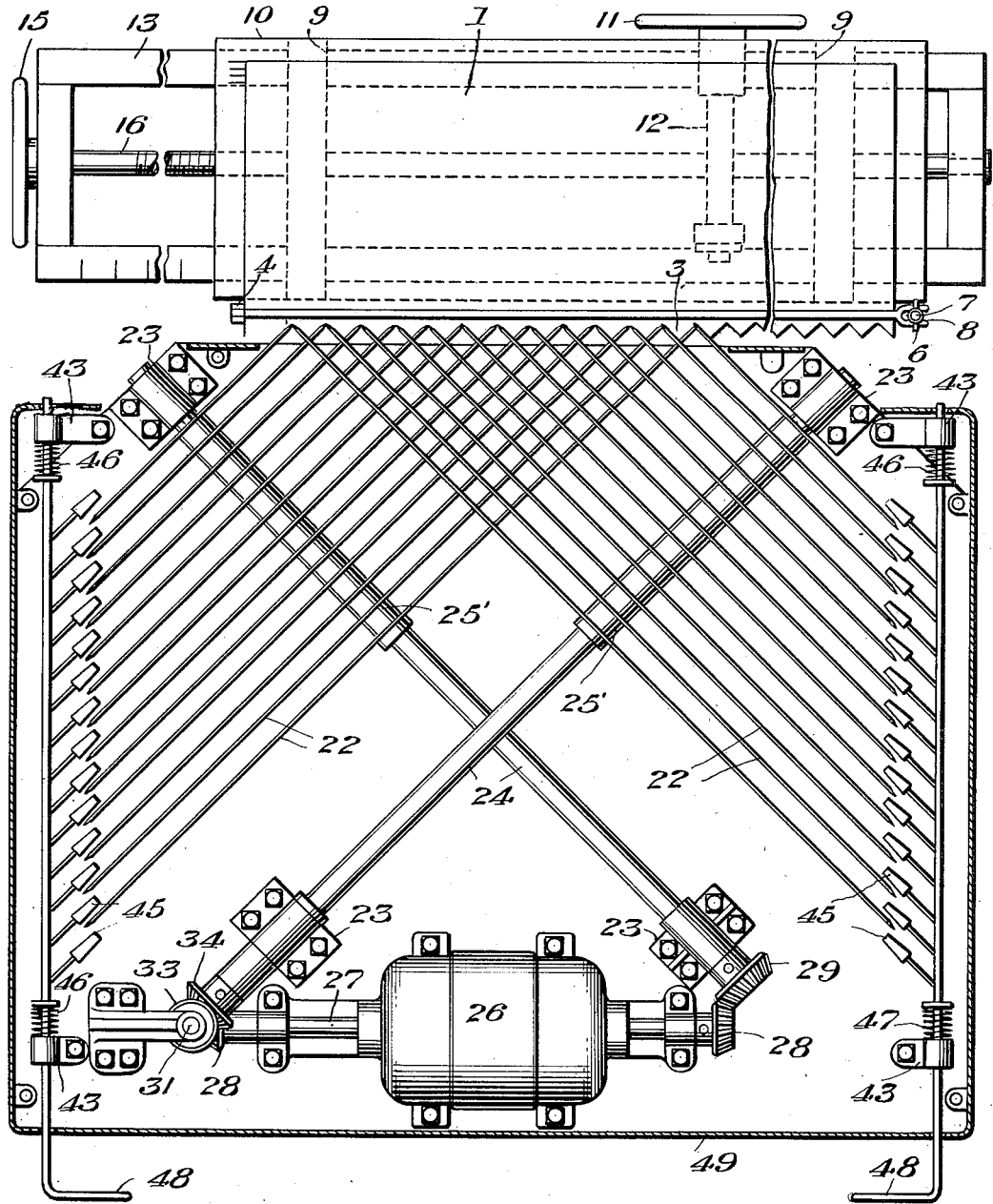
Fig. 1 is a top plan view, partly broken away and with parts shown in section, of a machine constructed in accordance with my invention.

Referring to the drawings by numeral, I designates a horizontally disposed preferably rectangular table for supporting a stack of strips 2 of fabric, and having along one side edge a line of wedge-shaped notches 3. Pivoted to the table I as at 4 is a clamping bar 5 designed to overlie the stack of strips and to secure them in position on said table in overlying position relative to the notches 3. A wing nut 6 and a bolt 7 are provided on the table I for cooperation with a slotted portion 8 of said bar 5 to secure the latter in clamping position. The table I is adjustably mounted upon guides 9 on a carriage 10 for adjustment transversely, as by a suitably arranged hand wheel 11 and worm shaft 12. The carriage 10 is mounted for adjustment of the table I longitudinally. For this purpose said carriage is mounted upon guides 13 supported by legs 14, and a hand wheel 15 and worm shaft 16 are provided for adjusting the carriage 10 on said guides. The purpose of the transverse and longitudinal adjustments of the table I will presently appear.

Mounted adjacent the notched side of the table I is the "pinking" mechanism proper including a base 17 having a vertically disposed cylinder 18 depending therefrom. The base 17 is designed to rest upon the floor of a building or other suitable support and the cylinder 18 to be securely fixed against tilting from the vertical, as by embedding it in concrete or the like, as shown at 19. Slidably mounted in the cylinder 18 is a vertically movable plunger 20 having fast upon its upper end a platform 21.

Two series of disc-like concentric knives 22, spaced apart equidistantly in each series, are mounted on the platform 21, by means presently described, for rotation one above the other and the knives in each series are of successively different diameter and angularly related to those in the other series whereby they are adapted to cut a line of wedge-shaped notches in the clamped edges of the stack of strips 2, the cutting edges of the knives entering the notches 3 in the table I, as will be clear.

Journalled at their opposite ends in bearings 23 upstanding from the platform 21 are individual shafts 24 for each series of knives 22. The knives 22 are keyed to their respective shafts 24, as by squared portions 25 on said shafts and similarly shaped openings (not shown) in said knives, and are maintained in spaced apart relation by spacing collars 26.

The shafts 24 and knives 22 are designed to be rotated in directions such that the latter effect a downward cutting action against the stack of strips 2 and by the following means. Suitably secured to the platform 21 is an upstanding bracket 25 having affixed thereto a motor 26, the armature shaft 27 of which has fast upon its offset ends bevelled gears 28, respectively. One of said gears 28 meshes with a similar gear 29 fast upon the shaft 24 of the lowermost series of knives 22, whereby rotation is imparted to said shaft and knives in a clockwise direction, as viewed in Fig. 2. The other gear 28 meshes with a bevelled gear 30 fast on a vertical jack shaft 31 suitably journalled at its opposite ends in a bearing bracket 32, and having fast thereon a bevelled gear 33 meshing with a bevelled gear 34 fast on the uppermost shaft 24 to drive the latter together with the uppermost series of knives 22 in a counter-clockwise direction, as viewed in Fig. 2.

In the normal or starting position, the series of knives 22 are located above the table 1 and the work thereon. To effect the "pinking" or notching operation said series of knives are lowered to effect their successive engagement with the strips 2 so that opposite edges of the notches are cut alternately. To accomplish the lowering and elevation of said knives 22, a rack 35 is secured in any suitable manner to the plunger 20, said rack meshing with the toothed pinion 36 fast upon a shaft 37 journalled in bearing brackets 38 upstanding from the base 17. The shaft 37 is adapted to be rotated by a hand wheel 39 fast thereon so that the plunger 20, platform 21 and knives 22 may be elevated or lowered at will. A ratchet wheel 40, fast on the shaft 37 and engaged by a releasable ratchet 41 suitably mounted on a bracket 42, holds the platform 21 and knives 22 in elevated position but permits their descent under the restraint of the hand wheel 39 when desired.

Slidably mounted in brackets 43 are horizontal rods 44, one of which is associated with each of the series of knives 22. Projecting laterally from each rod 44 is a series of cone-shaped sharpening devices 45 arranged to engage opposite sides of the cutting edges of their associated knives upon movement of the rods 44 in opposite directions, respectively. Springs 46 interposed between the brackets 43 and collars 47 on said rods 44 yieldingly retain said rods 44 and sharpening devices 45 in an intermediate ineffective position. Hand grips 48 are provided on the rods 44 for manual manipulation of the latter in either direction to move the sharpening devices 45 to effective position. Preferably the before-described parts mounted upon the platform 21 are covered by a casing 49 supported on said platform by lugs 50.

In operating my invention a stack of fabric strips 2 is arranged upon the table 1 with their edges, adjacent the notching mechanism proper, aligned with each other and with the side edge of the table 1 and clamped in position by the before-described clamping rod 5. The motor 26 having been started, by any suitable means not deemed necessary to illustrate herein, the ratchet 41 is released and the knives 22 lowered under the control of the hand wheel 39, it being understood that the table 1 has been fed longitudinally to register the notches 3 therein with the cutting edges of the knives 22. As the knives 22 are lowered, the lowermost series cuts one side of a line of notches in the clamped edge of the strips 2 and the uppermost series subsequently cuts the other side of said notches. The knives 22 are then elevated to their normal starting position and the table 1 and carriage 10 may be adjusted longitudinally by means of the hand wheel 15 and worm shaft 16 to locate an unnotched portion of the stack of strips 2 in position relative to the knives 22 for a repetition of the before-described operation, and these operations may be repeated until the clamped edges of the entire stack of strips 2 have been notched. Obviously, by means of the hand wheel 11 and worm shaft 12, the table 1 may be adjusted toward or from the knives 22 to determine the depth of the notches to be cut.

What is claimed as new is:

1. In a machine of the class described, a work supporting table, series of disc-like rotatable knives angularly related to each other and to the edge of the table to cut a line of wedge-shaped notches, the knives in each series being equally spaced apart and of progressively diminishing diameters from the innermost knife to the outermost knife, and means for engaging said series of knives successively in the direction of said line of notches.

2. In a machine of the class described, a work supporting table having a line of wedge-shaped notches in one edge thereof, two series of disc-like rotatable knives of progressively diminishing diameters in each series, said series being angularly related to cut a line of wedge-shaped notches and arranged for successive cutting of opposite sides of said notches, and means for operatively positioning said series of knives successively in the notches in the table and in the direction of said line of notches.

3. In a machine of the class described, a work supporting table, two series of disc-like rotatable knives of progressively diminishing diameters from the innermost knife to the outermost knife in each series, said series being angularly related to cut a line of wedge-shaped notches and arranged one above the other for successive cutting of opposite sides of said notches, and means for operatively engaging said series of knives successively in the direction of said line of notches.

4. In a machine of the class described, a work supporting table, two series of disc-like rotatable knives angularly related to cut a line of wedge-shaped notches, means for operatively engaging said series of knives with an edge of the work to cut said line of notches therein, and means operative to feed said table in the direction of said line of notches.

5. In a machine of the class described, a work supporting table, two series of disc-like rotatable knives angularly related to cut a line of wedge-shaped notches, means for operatively engaging said knives with an edge of the work to cut a line of said notches therein, and means operative to adjust the table toward and from the knives, respectively, to vary the depth of the notches cut in said edge.

6. In a machine of the class described, a work supporting table having a line of wedge-shaped notches in one edge, a clamp for securing an edge of the work to the table and over said notches, two series of disc-like rotatable knives angularly related to cut a line of notches, and means for operatively positioning said series of knives in the notches first named and against said edge of the work.

7. In a machine of the class described, a work supporting table, two series of disc-like rotatable knives angularly related to cut a line of wedge-shaped notches, means for operatively engaging said series of knives with an edge of the work to cut said line of notches therein, means operative to feed said table in the direction of said line of notches, and means operative to adjust said table toward and from said series of knives, respectively, to vary the depth of the notches cut in said edge.

8. In a machine of the class described, a work supporting table, two horizontal series of vertically disposed rotatable knives angularly related to cut a line of wedge-shaped notches, the knives in each series being equally spaced apart and of progressively diminishing diameters from the innermost knife to the outermost knife, means for opertively engaging said knives with an edge of the work to cut a line of said notches therein, and means operative to adjust said table towards and from the edge of said knives to vary the depth of the notches cut in said edge.

9. In a machine of the class described, a work supporting table, two series of rotatable knives arranged in planes, one above the other, and angularly disposed with the forward cutting edges of the knives in one series in substantial vertical alignment with the forward cutting edges of the knives respectively in the other series, said series of knives being movable vertically towards and away from the forward edge of the work supporting table and means for moving said series of knives to successively engage the work supported upon the said table to cut a line of notches in the edge portions of the work.

10. The method of pinking the edges of fabrics which consists in stacking the fabrics upon a platform having a series of wedge-shape notches in one edge thereof and with the portion of the edges of the fabrics to be pinked disposed over the notches, cutting by a downward movement of a series of revolving knives, a series of spaced slits in the edge portions of the fabrics overlying the notches and inwardly from and at an angle to the registered edges of the fabrics and then cutting by a downward movement of a series of revolving knives a second series of spaced slits in the edge portions of the fabrics overlying the notches and inwardly from the registered edges of the fabrics to the inner ends of the first slits and at an angle thereto.

THOMAS CROCELLA.